United States Patent [19]

Wakeman et al.

[11] Patent Number: 5,740,175
[45] Date of Patent: Apr. 14, 1998

[54] FORWARDING DATABASE CACHE FOR INTEGRATED SWITCH CONTROLLER

[75] Inventors: Laurence N. Wakeman, Mountain View; Roy T. Myers, Jr., Santa Clara, both of Calif.

[73] Assignee: National Semiconductor Corporation, Santa Clara, Calif.

[21] Appl. No.: 538,321

[22] Filed: Oct. 3, 1995

[51] Int. Cl.⁶ .................................................. H04Q 11/04
[52] U.S. Cl. ...................... 370/422; 370/397; 395/200.2; 395/200.12
[58] Field of Search .................................. 370/422, 428, 370/395, 396, 397, 382, 401, 402; 395/200.02, 200.12

[56] References Cited

U.S. PATENT DOCUMENTS

| | | | |
|---|---|---|---|
| 5,161,156 | 11/1992 | Baum et al. | 370/422 |
| 5,515,376 | 5/1996 | Murthy et al. | 370/428 |
| 5,528,592 | 6/1996 | Schibler et al. | 370/397 |
| 5,539,449 | 7/1996 | Blahut et al. | 370/396 |
| 5,579,503 | 11/1996 | Osborne | 395/200.2 |

*Primary Examiner*—Douglas W. Olms
*Assistant Examiner*—Shick Hom

*Attorney, Agent, or Firm*—Skjerven, Morrill, MacPherson, Franklin & Friel; Edward C. Kwok

[57] ABSTRACT

A LAN network switch includes a RAM forwarding database which contains the address-to-port mappings for all the workstations or other devices connected to the switch's plurality of ports and further includes at least one CAM-cache connected to respective one or more of the switch's ports. The CAM-cache, having an access time much faster than that of the forwarding database, stores selected ones of the address-to-port mappings. When it is desired for the switch to forward a packet, the destination address is extracted and the CAM-cache is accessed and searched. If the correct mapping is contained in the CAM-cache, the packet is immediately forwarded to the destination port without accessing the much larger and slower forwarding database. Only if the CAM-cache does not contain the correct mapping is the forwarding database accessed to retrieve the correct mapping. The packet is then forwarded to the destination port, and the CAM-cache is updated with this mapping so that succeeding packets having the same destination address-to-port mapping may be forwarded to the destination port by accessing only the fast CAM-cache and, by eliminating the need to access the much slower forwarding database, increasing the forwarding speed of the switch.

8 Claims, 3 Drawing Sheets ns or user interface devices such as PCs. Communication between workstations and any attached server(s) is controlled in accordance with ethernet protocol, IEEE 802.3.
FORWARDING DATABASE CACHE FOR INTEGRATED SWITCH CONTROLLER

FIELD OF THE INVENTION

This invention relates to a communications switch and in particular to an Ethernet switch controller.

BACKGROUND

Local area networks (LANs) have become increasing popular in business and industrial applications, in part because of their flexibility in allowing multiple users to communicate with one another and with one or more commonly accessible servers. A typical LAN system may include hundreds or even thousands of individual workstations or user interface devices such as PCs. Communication between workstations and any attached server(s) is controlled in accordance with ethernet protocol, IEEE 802.3.

More recent LANs employ a network switch to interface between groups of attached workstations, as shown in FIG. 1. A network switch 10 typically includes a switch engine (SE) 11, a forwarding database (FDB) 12, and one or more dozens of ports 13–16, each having an associated network segment 13a–16a, respectively, attached thereto. Each of segments 13–16a may, in turn, have one or more workstations 21 "hanging" therefrom. Note that switch 10 is shown to have only 4 ports 13–16 for simplicity. Media access controllers (MAC) 17–20 are provided at associated ones of ports 13–16.

Switch 10, operating in accordance with IEEE 802.3 protocol, directs data transmission between segments 13–16 of the LAN. Data is typically transmitted as a series of data packets, each containing a source address and a destination address. Upon receiving a packet of data from a source workstation 21 hanging on for instance port 13, MAC 17 alerts SE 11 of the incoming packet and of its destination address. SE 11 allocates memory (not shown) to temporarily store the packet and directs MAC 17 to forward the packet to memory. SE 11 uses the destination address to retrieve from FDB 12 the correct destination address-to-port mapping (destination mapping), and then alerts the MAC associated with the destination port where in memory to retrieve the temporarily stored packet. The MAC then forwards the packet onto the associated port's attached segment where it can be retrieved by the MAC associated with the destination port. This "destination" MAC then forwards the packet to the destination workstation 21.

SE 11 must be able to retrieve the destination mappings from FDB 12 fast enough to keep pace with incoming packets. If FDB 12 is too slow, incoming packets will undesirably be queued in SE 11. Unless SE contains a fairly large memory, queuing packets in such a manner not only reduces the speed by which switch 10 forwards data but also may result in the loss of queued packets.

FDB 12 is typically implemented either as a hardware content addressable memory (CAM) or as a RAM. A hardware CAM is very fast and can typically retrieve mappings in less than 100 ns. A RAM, on the other hand, requires a searching algorithm and typically requires several microseconds to locate the correct mapping and, thus, is typically too slow to keep up with SE 11.

Although much faster, however, a hardware CAM database large enough to service a LAN having as few as a hundred or so attached workstations can be prohibitively expensive. A RAM-based database, on the other hand, can be implemented at a fraction of the cost of such hardware CAM.

Choosing an appropriate network switch thus requires a balancing between cost and performance. As the speed and size requirements of an associated LAN change, however, the initial choosing between a CAM and a RAM database may become invalid. For example, the performance limitations of a RAM database may be insignificant in a LAN system having only a few attached workstations and be far outweighed by the cost savings afforded by such a RAM database. Where, however, it is desired to increase the number of attached workstations is dramatically increased, the RAM database may not be fast enough to keep pace with the now more congested communication between network segments, thereby resulting in, as mentioned above, slower forwarding speeds and lost information.

Thus, there is need for a network switch which is not confined by the rigid balancing between the superior performance of a CAM database and the cost savings of a RAM database.

SUMMARY

A network switch is herein disclosed which overcomes problems in the art discussed above. In accordance with the present invention, a network switch for use in a LAN system includes a RAM forwarding database containing the address-to-port mappings for each workstation or other device connected to the switch's plurality of ports, and also includes a CAM-cache connected to each of the switch's ports. The CAM-cache has an access time much faster than that of the forwarding database.

Upon receiving an incoming data packet, the MAC associated with the source port will, after extracting the destination address from the packet, access its associated CAM-cache to find the correct address-to-port mapping. If the correct mapping is contained in the CAM-cache, the packet may be immediately forwarded to the destination port without having to access the much larger and slower forwarding database.

Where the CAM-cache does not contain the correct mapping, the MAC then causes the correct mapping to be retrieved from the forwarding database. The packet may then be forwarded to the correct destination port. The CAM-cache is then updated with this mapping so that succeeding packets having the same destination address-to-port mapping may be quickly forwarded to the destination port by accessing only the fast CAM-cache, thereby eliminating the need to access the much slower forwarding database. The size of the CAM-cache is kept to a minimum in order to achieve savings in implementation costs. In this manner, present embodiments may achieve faster forwarding speeds without substantial increases in cost.

DETAILED DESCRIPTION

Embodiments in accordance with the present invention are described below in the context of a distributed DMA architecture for simplicity. However, it is to be understood that such embodiments and the advantages realized thereby are equally well applicable to architectures which employ other methods of storing and retrieving data to and from memory, including but not limited to "cut-through" and "store and forward" architectures.

Applicants have found that the speed of network switches can be improved by taking advantage of certain "locality of addressing" characteristics of LAN systems. Recalling that information is forwarded between workstations within a LAN as a series of data packets, it is likely that, when forwarding data files such as documents which may comprise hundreds or even thousands of packets, successive packets received at a particular switch port will have identical destination addresses. Further, since a particular workstation will most often communicate with only a few other workstations, servers, and so on, such as in the case of a user frequently downloading information from some remote memory location, the MAC which serves that particular workstation will see certain destination addresses more often than other destination addresses. This locality of addressing characteristic also results in increased switching speeds where multiple workstations hanging on a common segment most frequently communicate with a workstation or server hanging on some other segment.

Figure 1:
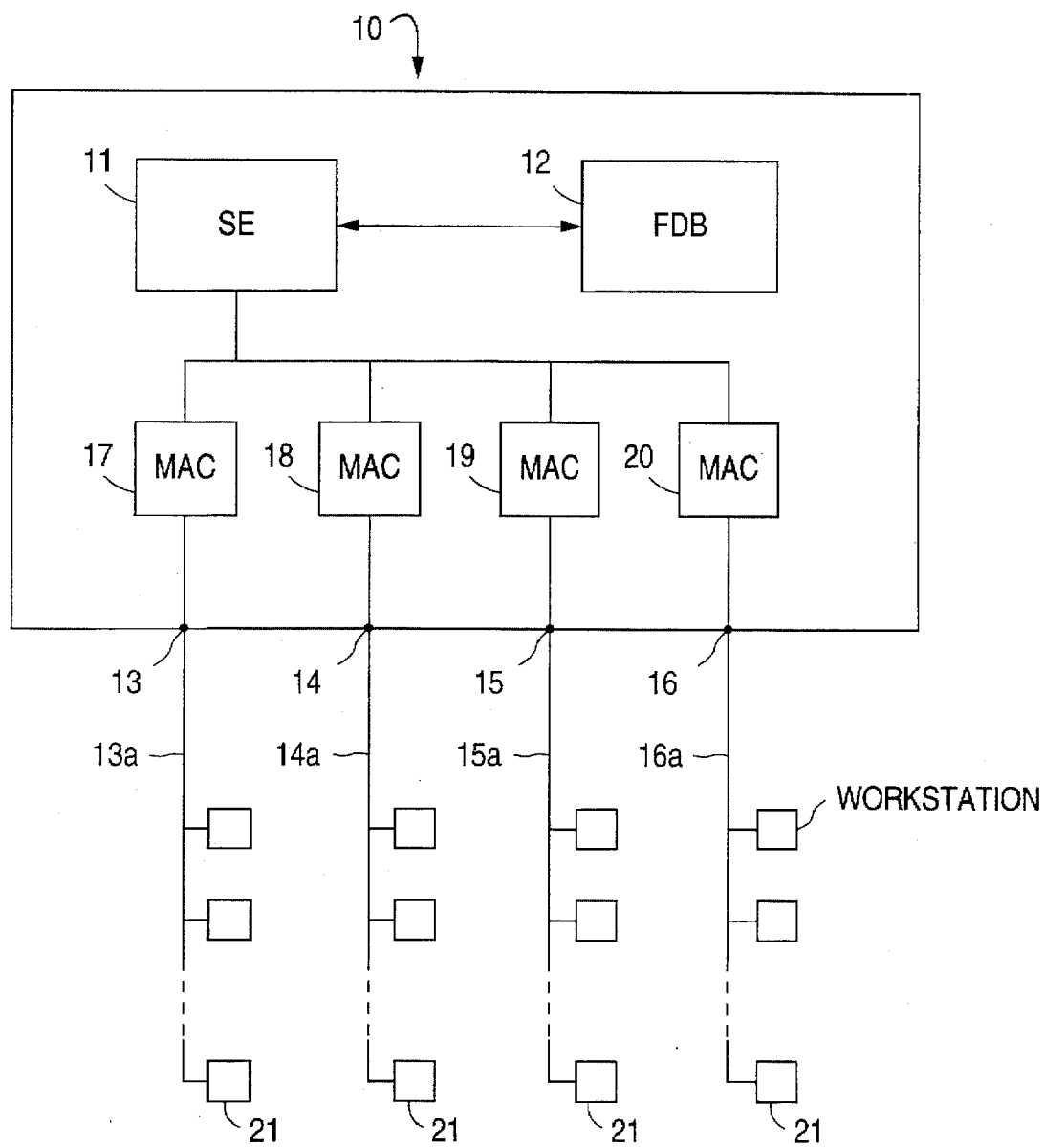
FIG. 1 is a block diagram of a LAN system employing a conventional network switch.
Figure 2:
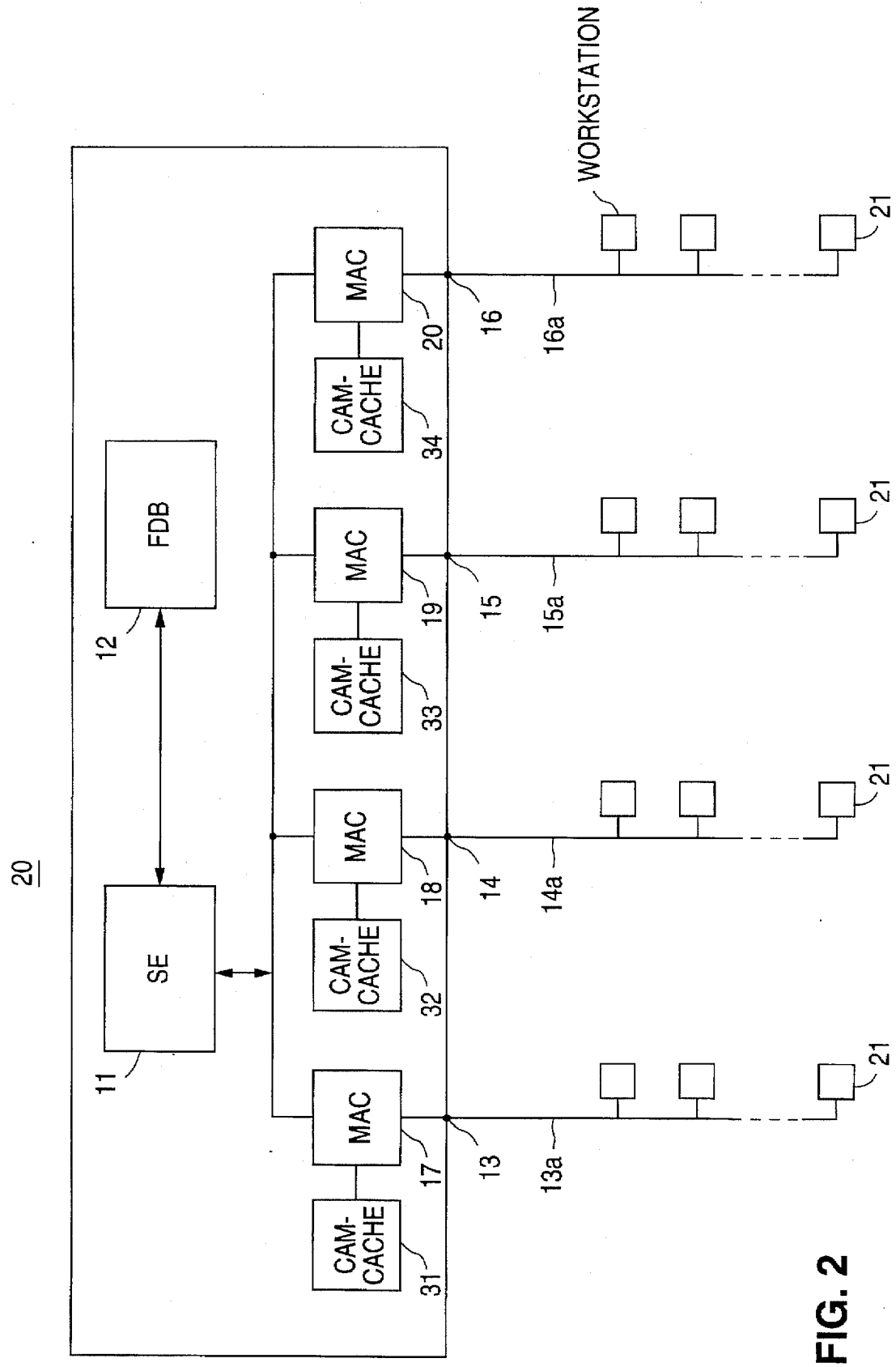
FIG. 2 is a block diagram of a LAN system employing a network switch in accordance with one embodiment of the present invention.

FIG. 2 shows a network switch 20 in accordance with one embodiment of the present invention. Those aspects common to switch 20 and prior art switch 10 (FIG. 1) are appropriately labelled with the same notations. It is to be noted that switch 20 is shown to have four ports 13–17 for simplicity only; in actual embodiments switch 20 may include a fewer or greater number of such ports. FDB 12 is, in actual embodiments, preferably a RAM database such that significant costs saving may be realized at the expense of forwarding speed, as compared to a hardware CAM database.

Unlike conventional network switches, switch 20 includes a plurality of identical CAM caches 31–34 connected to respective ones of MACs 17–20. CAM caches 31–34 may retrieve mappings in less than 100 ns. In order to minimize cost, the size of each of CAM caches 31–34 should be minimal. As will be discussed below, the exact size of CAM caches 31–34 may vary depending upon cost and performance requirements. The operation of switch 20 and in particular CAM caches 31–34 is as follows.

Suppose it is desired to send a data file from a source workstation 21 hanging on port 13 to a destination workstation 21 hanging on port 14. Upon receiving the first packet from segment 13a, MAC 17 extracts the destination address and, while simultaneously forwarding the packet to memory allocated by SE 11 (not shown) for temporary storage, searches CAM cache 31 for the correct destination mapping.

Figure 3:
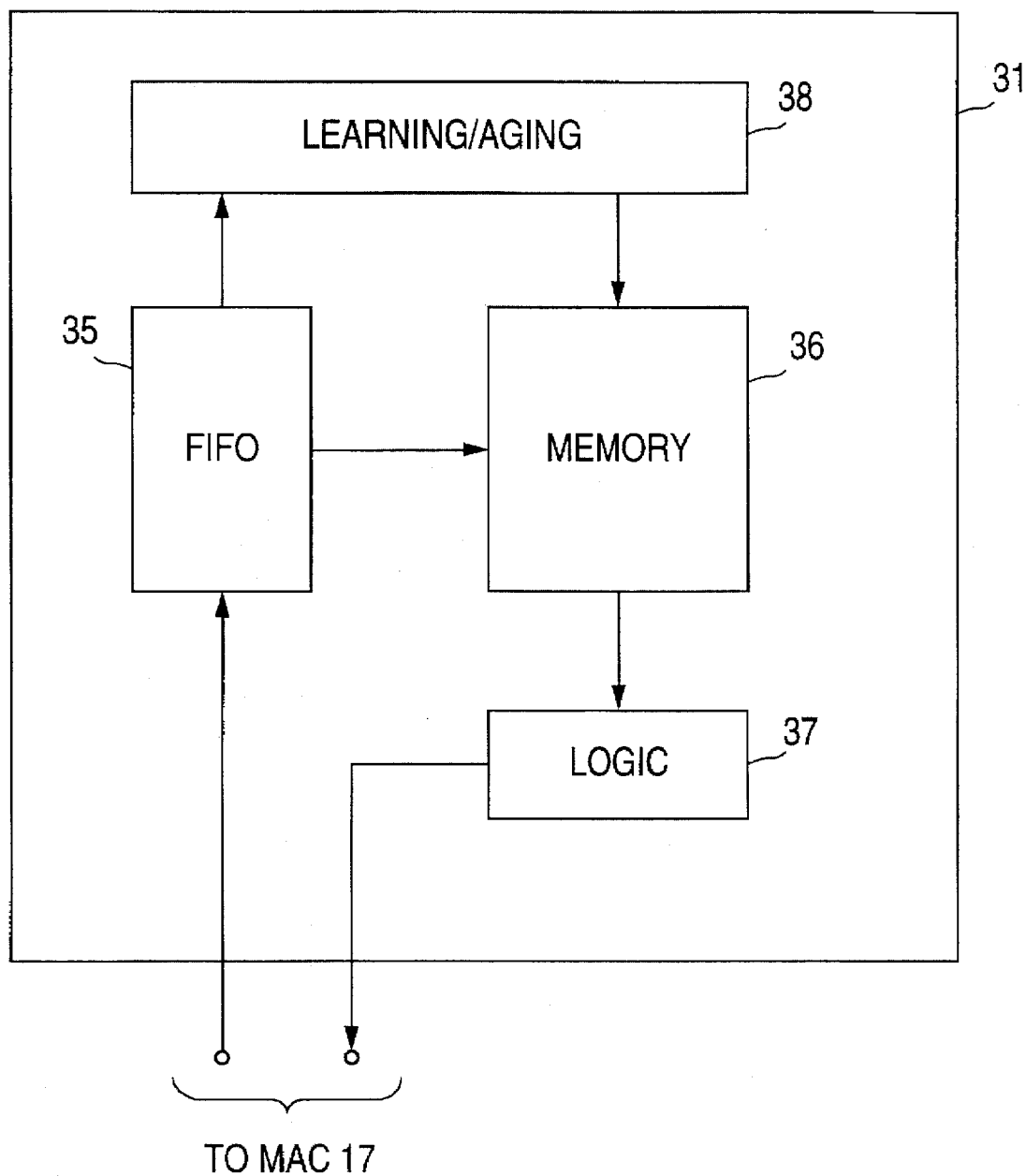
FIG. 3 is a block diagram of a LAN system employing a network switch in accordance with another embodiment of the present invention.

FIG. 3 illustrates the internal architecture of CAM cache 31 which, in accordance with the preferred embodiment, includes a FIFO 35, a memory 36, a learning and aging block 38, and logic 37. These elements are well understood in the art and thus will not be discussed below. The extracted source and destination addresses of the first packet are queued in FIFO 35 which, in turn, provides the destination address to memory 36. If the correct destination mapping is contained in memory 36, there is thus a match and memory 36 provides the correct destination port to logic 37 which, in turn, forwards the port location and a "hit" signal to MAC 17. MAC 17 then alerts SE 11 of the correct destination port. SE 11 informs MAC 18 that a packet is "addressed" thereto and directs the first packet to MAC 18 which, in turn, forwards the packet to segment 14a where it will be accepted by the workstation having the correct destination address. Thus, where the correct destination mapping is contained in CAM cache 31, accessing and searching FDB 12 is wholly unnecessary. Since the accessing speed of CAM cache is much faster than that of FDB 12, the inclusion of CAM caches 31–34 in a network switch as described above results in an increase in forwarding speed. Note that although the FDB 12 in switch 20 is preferably a RAM, CAM caches 31–34 will decrease the access time and thus increase forwarding speeds irrespective of the particular construction of FDB 12 (e.g., where FDB 12 is a hardware CAM as opposed to RAM).

If the correct destination mapping is not contained in memory 36, logic 37 sends a "miss" signal to MAC 17 which then alerts SE 11 of the destination address extracted from the packet. SE 11 then searches FDB 12 to locate the correct destination mapping and, having retrieved the correct destination mapping, forwards the packet as described earlier with reference to prior art switch 10.

Taking advantage of the above mentioned locality of addressing characteristic of LANs to further increase the forwarding speed of switch 20, CAM cache 31 is updated with destination mapping of the first packet as follows. In addition to retrieving the destination mapping from FDB 12 and instructing MAC 18 to retrieve the first packet from memory, as described above, SE 11 also forwards the destination mapping to MAC 17 which, in response to having received a miss signal from CAM cache 31–34, provides the current destination mapping to CAM cache 31 where it is stored in memory. Note that where memory 36 is full, an "old" destination mapping must be removed in order to make room for the new destination mapping. The particular "old" destination mapping which is to be replaced in memory 36 with the new destination mapping received from FDB 12 may be selected in a number of ways, including but not limited to selecting the mapping (1) least frequently accessed and (2) least recently accessed. This function is performed, in a conventional manner, by learning and aging block 38.

Thus, using the above example, the remaining packets comprising the data file desired to be forwarded from segment 13a to segment 14a may be quickly forwarded to the correct destination workstation without having to access and search FDB 12, thereby further increasing the forwarding speed of switch 20. Note that the forwarding speed of switch 20 is similarly increased where a user most often communicates with a few other workstations, servers, or other designated devices, and also where multiple workstations hanging on a common segment most often communicate with a single workstation, server, or other designated device hanging on another segment, since the correct destination mapping should remain stored in memory 36 of CAM cache 31.

CAM caches 31–34 also have a filtering function to avoid duplicate forwarding of packets during communications between workstations hanging on the same port. For example, suppose it is desired to send data from a first workstation 21 on port 13 to a second workstation on port 13. Since both the source and destination workstations hang on segment 13a, the destination workstation 21 will "hear" the destination address of the transmitted packet and, recognizing the destination address as its own, will accept the packet. MAC 17 will also receive the packet and, as described above, will access and search CAM cache 31. Switch 20 is configured such that MAC 17 provides only destination address-to-port mappings to memory 36 of CAM cache 21 and thus, as will be apparent shortly, memory 36 should never contain a source address-to-port mapping. That is, memory 36 of CAM cache 31 coupled to port 13 should never store a mapping for which port 13 is the destination. Accordingly, in such a case CAM cache 31 of port 13 provides a miss signal to MAC 17, which then informs SE 11 of the incoming packet and its source and destination addresses. After retrieving the destination mapping from FDB 12, SE 11 sends the destination mapping to MAC 17 which, recognizing the destination port as its own, ignores the packet and proceeds with the next incoming packet.

Since hardware CAM databases are very expensive to implement, as opposed to RAM databases, CAM caches 31–34 are preferably designed to have the minimal necessary memory for proper operation of switch 20. The particular size of CAM caches 31–34 employed in actual embodiments of switch 20 may vary depending upon a number of factors, including the number of ports contained in switch 20, the number of attached workstations, the amount of network traffic and, of course, cost and performance considerations.

Applicants have found that where CAM caches 31–34 are of such a size that approximately 90% of all packet forwarding is service by CAM caches 31–34 without resort to FDB 12, switch 20 achieves forwarding speeds as much as ten times faster as compared to with conventional network switches utilizing only a RAM FDB 12.

In other embodiments of the present invention, the above described function of CAM caches 31–34 may be distributed across ports 13–16 of switch 20, where one of the CAM caches described above may service more than one port.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A switch for routing a data packet including a destination address within a network having a plurality of workstations attached thereto, said switch comprising:

a microprocessor;

a random access database for storing address-to-port mappings, said database being coupled to said microprocessor;

a plurality of ports coupled to said workstations;

a plurality of media access controllers each coupled to one of said ports and to said microprocessor; and a cache device coupled to a first one of said media access controllers, said cache device for storing selected ones of said address-to-port mappings, wherein if any of said selected ones of said address-to-port mappings stored in said cache device corresponds to said destination address of said data packet, said first one of said media access controllers forwards said data packet to said destination address without accessing said database.

2. The structure of claim 1 wherein said cache device has access times substantially faster than that of said database.

3. The structure of claim 1 wherein said cache device has an access time of approximately 100 ns.

4. The structure of claim 1 wherein said cache device comprises:

an input terminal for receiving said data packet from said first one of said media access controllers;

an output terminal for providing said data packet to said first one of said media access controllers;

a first in, first out device coupled to said input terminal, said first in, first out device queuing said data packet;

a memory element coupled to said first in, first out device, said memory element storing said selected ones of said address-to-port mappings; and a logic element coupled between said memory element and said output terminal, said logic element generating a control signal indicative of whether any of said selected ones of said address-to-port mappings matches said destination address.

5. The structure of claim 4 wherein said cache device further comprises a learning/aging element coupled to said first in, first out device and to said memory, where in response to none of said address-to-port mappings matching said destination address, said learning/aging element causes an address-to-port mapping stored in said database which matches said destination address to be stored in said memory.

6. A method for routing a data packet from a source workstation to a destination workstation within a network system, said method comprising the steps of:

providing a switch having a plurality of ports, first and second ones of which being connected to said source and to said destination workstations respectively;

receiving said data packet at said first port;

extracting from said data packet a destination address using a media access controller disposed within said switch;

determining whether any of said selected ones of address-to-port mappings stored in a cache device coupled to said media access controller match said extracted destination address;

generating a control signal indicative of said determining step; and forwarding said packet to said second port in response to said control signal indicating one of said selected ones of said address-to-port mappings match said destination address without accessing a database disposed within said switch for storing address-to-port mappings of said plurality of ports.

7. The method of claim 6 further comprising the steps of:

retrieving, in response to said control signal indicating none of said selected ones of said address-to-port mappings match said destination address, the address-to-port mapping which corresponds to said destination address from said database; and forwarding said packet to said second port using said address-to-port mapping contained in said database.

8. The method of claim 7 further comprising the step of:

storing, in response to said control signal indicating none of said selected ones of said address-to-port mappings match said destination address, said address-to-port mapping retrieved from said database in said cache device.

* * * * *